US010472255B2

(12) United States Patent
Black et al.

(10) Patent No.: US 10,472,255 B2
(45) Date of Patent: *Nov. 12, 2019

(54) FLUID METERING SYSTEM

(71) Applicant: FlowCore Systems, LLC, Williston, ND (US)

(72) Inventors: Ian C. Black, Williston, ND (US); Charles D. Black, Williston, ND (US); Wesley F. Black, Williston, ND (US); Steven E. Hayden, Williston, ND (US)

(73) Assignee: Flowcore Systems, LLC, Williston, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,591

(22) Filed: Dec. 3, 2018

(65) Prior Publication Data

US 2019/0100444 A1 Apr. 4, 2019

Related U.S. Application Data

(63) Continuation-in-part of application No. 14/503,889, filed on Oct. 1, 2014, now Pat. No. 10,144,653.
(Continued)

(51) Int. Cl.
*G05D 11/02* (2006.01)
*G05D 11/08* (2006.01)
(Continued)

(52) U.S. Cl.
CPC .............. *C02F 1/008* (2013.01); *G01F 23/14* (2013.01); *G05D 11/132* (2013.01);
(Continued)

(58) Field of Classification Search
CPC ........ C02F 1/008; C02F 1/685; B01F 3/0865; B01F 3/088; B01F 15/00285;
(Continued)

(56) References Cited

U.S. PATENT DOCUMENTS 4,282,093 A 8/1981 Haga
4,538,445 A 9/1985 Kenik
(Continued)

FOREIGN PATENT DOCUMENTS

KR 20130066108 6/2013

OTHER PUBLICATIONS http://www.enbasesolutions.com/index.php; Chemical Automation System from Enbase Solutions; Received and Printed on Sep. 30, 2014.
(Continued)

*Primary Examiner* — Robert Clemente
*Assistant Examiner* — Akash K Varma
(74) *Attorney, Agent, or Firm* — Neustel Law Offices

(57) ABSTRACT

A fluid metering system for accurately measuring and dosing one or more fluids. The fluid metering system generally includes a closed loop feedback system that monitors the volume of liquid chemical input into a system over a period of time. Based on the measured amount of chemical input into a system over a period of time, the system calculates whether or not an adjustment is required for the next input of chemical. The various embodiments utilize a measuring tube that is filled with a liquid chemical. A pressure sensor measures the pressure of the chemical in the measuring tube when filled and after emptied to calculate the total volume of chemical input into the system.

20 Claims, 14 Drawing Sheets

Related U.S. Application Data

(60) Provisional application No. 61/885,152, filed on Oct. 1, 2013.

(51) Int. Cl.
  *G05D 7/00* (2006.01)
  *G01F 1/00* (2006.01)
  *C02F 1/00* (2006.01)
  *G01F 23/14* (2006.01)
  *G05D 11/13* (2006.01)

(52) U.S. Cl.
  CPC .... *C02F 2201/005* (2013.01); *C02F 2209/03* (2013.01); *C02F 2209/42* (2013.01); *C02F 2303/04* (2013.01); *C02F 2303/08* (2013.01); *C02F 2303/22* (2013.01)

(58) Field of Classification Search
  CPC ..... B01F 15/0462; G05D 11/02; G05D 11/08; G05D 7/00; G01F 1/00
  USPC ........................................................ 210/96.1
  See application file for complete search history.

(56) References Cited

U.S. PATENT DOCUMENTS

| | | | |
|---|---|---|---|
| 4,648,043 A * | 3/1987 | O'Leary | B01F 15/00227 137/93 |
| 6,074,551 A | 6/2000 | Jones | |
| 6,129,104 A | 10/2000 | Ellard | |
| 6,200,466 B1 | 3/2001 | Bender | |
| 6,773,611 B2 | 8/2004 | Perlich | |
| 6,981,553 B2 | 1/2006 | Stegemeier | |
| 7,263,448 B2 | 8/2007 | Brown | |
| 7,955,853 B2 | 6/2011 | Hicks | |
| 8,066,940 B2 * | 11/2011 | Denkewicz, Jr. | C02F 1/325 210/748.01 |
| 8,515,581 B2 | 8/2013 | Piironen | |
| 8,532,829 B2 | 9/2013 | Haller | |
| 2004/0149436 A1 | 8/2004 | Sheldon | |
| 2009/0112364 A1* | 4/2009 | Chen | C02F 1/686 700/266 |
| 2011/0241230 A1 | 10/2011 | Kerfoot | |
| 2013/0068532 A1 | 3/2013 | Bansal | |
| 2013/0126152 A1 | 5/2013 | Banks | |
| 2013/0153231 A1* | 6/2013 | Ayres | G05D 7/0635 166/305.1 |
| 2013/0192841 A1 | 8/2013 | Feasey | |

OTHER PUBLICATIONS

PCT Search Report Received from the International Searching Authority; Received and Printed on Jan. 6, 2015.

Wave Control Systems Ltd Uninterruptable Chemical Supply System Operational Brochure; Prior to Application Filing Date.

http://wavecontrol.ca/our-products/chemical-injection-metering-and-monitoring-packages/; Wave Control Systems Ltd Webpage; Prior to Application Filing Date.

http://www.profireenergy.com/products/PC180_fuel_package.html; Profire Energy PC180 Full Tank Package Webpage; Prior to Application Filing Date.

http://www.graco.com/us/en/products/business-unit/ong.html; Graco Oil & Natural Gas Product Webpage; Prior to Application Filing Date.

\* cited by examiner

FLUID METERING SYSTEM

CROSS REFERENCE TO RELATED APPLICATIONS

The present application is a continuation-in-part of U.S. application Ser. No. 14/503,889 filed on Oct. 1, 2014 which issues on Dec. 4, 2018 as U.S. Pat. No. 10,144,653, which claims priority to U.S. Provisional Application No. 61/885,152 filed Oct. 1, 2013. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

A. Field

Example embodiments in general relate to a fluid metering system for accurately measuring and dosing one or more fluids.

B. Related Art

Any discussion of the related art throughout the specification should in no way be considered as an admission that such related art is widely known or forms part of common general knowledge in the field.

An oil well produces a mixture of oil, water, and gas. Sometimes the water has a high level of salt content which can result in the accumulation of salt within the tubing and various other components. To remedy this problem, fresh water is often pumped down the oil well to reduce the concentration of salt within the salt water. The fresh water is often times treated with scale inhibitors, corrosion inhibitors, desalination chemicals, biocides and various other liquid additives to reduce damage to the various components (e.g. tubing, casing, pumps, valves, etc.) of the oil well. The fresh water and chemical are often pumped down between the casing and the tubing to the bottom of the oil well. The liquid chemicals may alternatively be pumped to the bottom of the oil well using a "capillary string" which is a narrow capillary tubing that extends along the passage between the casing and the tubing of the oil well. The liquid chemicals may also be injected between the tubing and casing at the top allowing the liquid chemicals to pass through the space between the casing and the tubing.

Once brought to the surface, the mixture of oil, water and gas pulled from an oil well is passed through a separator or other treatment device that separates the oil, water and gas into their separate components. The separated oil is typically transferred to an oil storage tank to later be transferred via a pipeline or truck to a gathering station. Eventually this oil is then transferred via pipeline or by railroad to an oil refinery. The separated water is typically transferred to a saltwater collection tank to later be transferred via pipeline or truck to a salt water disposal well (e.g. often an abandoned oil well), where it is pumped back down into the ground.

The separated gas is transported to a gas plant for processing via pipeline; however, if no pipeline is available, the gas is burned off via a flare. Often, natural gas may be treated with methanol to prevent the freezing of precipitated water within the gas line which can result in damage to the gas transfer system. Additionally, untreated hydration can freeze and completely block the gas line. The separated gas may also be treated with, but is not limited to, an H2S liquid scavenger to convert any hydrogen sulfide to a non-lethal form.

Mixing two or more fluids together in an accurate ratio is required in many different applications such as, but not limited to, treating water and components used in the oil and gas industry. Also, because of the expense of liquid chemicals used in some industries, it is important to accurately meter the desired amount of liquid chemical to prevent over treating which can result in thousands of dollars in wasted chemical.

One example of water used in the oil and gas industry involves where water is injected into an oil well to dilute salt water that exists in the oil well to prevent buildup of salt on the various components of the well. To further the example, a water pump may be activated for 10 minutes to inject water into the oil well, deactivated for 23 minutes, activated again for 10 minutes and so forth in a cycling manner based on the set parameters for the oil well. It is important to chemically treat the water prior to injection into the well with liquid chemicals such as, but not limited to, scale inhibitors, corrosion inhibitors, desalination chemicals, biocides and various other liquid additives. Often times the chemicals added to the water are in very small amounts such as 5 parts per million (ppm) to over 1,000 ppm. It is important to ensure that the minimum required amount of chemical is added to the water while at the same time preventing excessive chemical usage. This chemical is delivered to the well by fresh water or can be injected directly into the well bore without fresh water. This chemical is injected at a rate that will treat all of the saltwater that a well produces which is often many times greater than the freshwater used to deliver the chemical.

One conventional system for dosing the water used in oil wells utilizes conventional chemical metering pumps that dispense small doses of chemical into the water or directly into the well without water using a capillary tube or directly between the space between the well casing and tubing. A conventional metering pump may be comprised of various types of pumps (e.g. piston pumps, diaphragm pumps, gear pumps, etc.) that discharge a desired flow rate of liquid chemical when averaged over time within a discharge pressure range.

However, conventional metering pumps are inherently inaccurate thereby requiring the operator to set the metering pump to a chemical input level that exceeds the desired ratio of chemical per water. The excess chemical is wasted resulting in extra unnecessary expense to the operator and potentially damaging the environment.

Another problem with conventional metering pumps is that they are prone to air lock resulting in no chemical being injected. For example, when no chemical is added to an oil well's salt water for a period of time, damage to the oil well equipment can occur because of salt accumulation and corrosion.

Another problem with conventional metering pumps is they are not designed to adjust to the flow rate of water which may change over time. In addition, the flow rate of chemical emitted by the conventional metering pumps may also change over time resulting in increased or decreased chemical added to the water.

Another problem with conventional metering pumps is that they are not designed to adjust to various pressures which can adversely affect the originally set flow rate of the pump.

Because of the inherent problems with the related art, there is a need for a new and improved fluid metering system for accurately measuring and dispensing one or more liquid chemicals.

SUMMARY

An example embodiment is directed to a fluid metering system. The fluid metering system includes a closed loop feedback system that monitors the flow rate of the water and the volume of liquid chemical added to the water over a period of time. Based on the measured amount of chemical added to the water over a period of time, the system calculates whether or not an adjustment is required for the next addition of chemical to the water. The various embodiments may utilize a measuring tube that is filled with a chemical wherein a pressure sensor measures the pressure of the chemical in the measuring tube thereby allowing a control unit to calculate the total volume of chemical in the measuring tube. After chemical is input into the water from the measuring tube, the pressure sensor measures the remaining volume of chemical in the measuring tube to determine the total volume of chemical added to the water. There has thus been outlined, rather broadly, some of the features of the various embodiments of the invention in order that the detailed description thereof may be better understood, and in order that the present contribution to the art may be better appreciated. There are additional features of the embodiments of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The various embodiments of the invention are capable of other embodiments and of being practiced and carried out in various ways. Also, it is to be understood that the phraseology and terminology employed herein are for the purpose of the description and should not be regarded as limiting. There has thus been outlined, rather broadly, some of the embodiments of the fluid metering system in order that the detailed description thereof may be better understood, and in order that the present contribution to the art may be better appreciated. There are additional embodiments of the fluid metering system that will be described hereinafter and that will form the subject matter of the claims appended hereto. In this respect, before explaining at least one embodiment of the fluid metering system in detail, it is to be understood that the fluid metering system is not limited in its application to the details of construction or to the arrangements of the components set forth in the following description or illustrated in the drawings. The fluid metering system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview of First Embodiment

Figure 1:
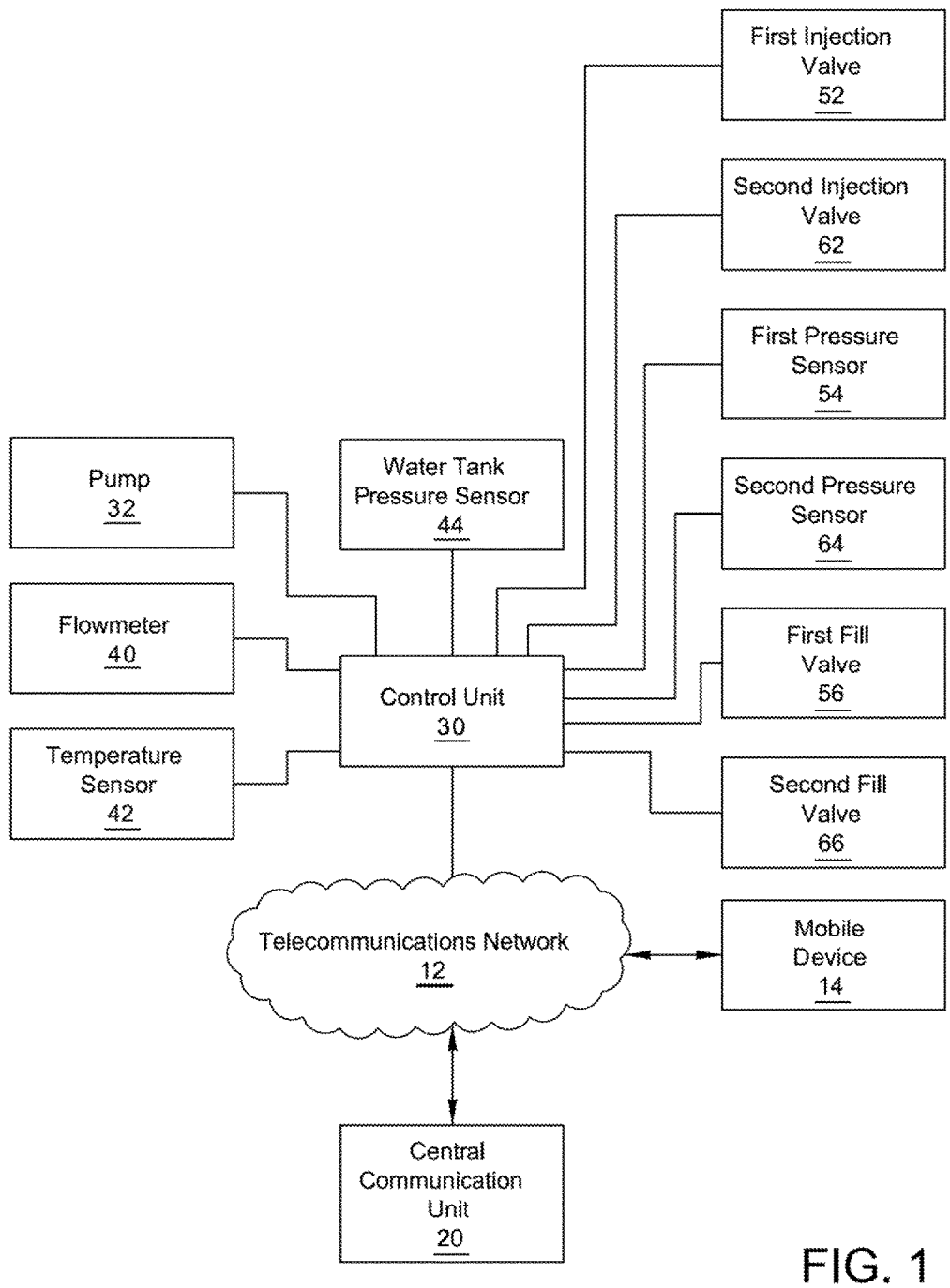
FIG. 1 is a block diagram illustrating the communications between the various components of a first embodiment.

An example fluid metering system generally comprises a closed loop feedback system that monitors the flow rate of the water and the volume of liquid chemical added to the water over a period of time. Based on the measured amount of chemical added to the water over a period of time, the system calculates whether or not an adjustment is required for the next addition of chemical to the water. The various embodiments preferably utilize a measuring tube that is filled with a chemical wherein a pressure sensor measures the pressure of the chemical in the measuring tube thereby allowing a control unit 30 to calculate the total volume of chemical in the measuring tube. After chemical is input into the water from the measuring tube, the pressure sensor measures the remaining volume of chemical in the measuring tube to determine the total volume of chemical added to the water. The chemical in the measuring tube is isolated from the overall system to provide for accurate measurements of the amount of chemical in the measuring tube.

The various embodiments disclosed are preferably utilized within water treatment systems that treat water prior to injection into an oil well 18, however, the various embodiments may be utilized in any application where a first liquid needs to be accurately combined with a second liquid. The various embodiments may also be utilized to treat an oil well 18 without a carrier fluid (e.g. water) thereby allowing the injection of chemical directly into the system needed to be treated such as a gas line. The various embodiments may be utilized with one, two or more additive tanks 58, 68 depending upon the number of chemicals needed to be added to the main fluid. In addition, the various embodiments may be utilized to treat water for one, two, three, four, five or more oil wells 18.

B. Exemplary Telecommunications Networks (12)

The various embodiments may be utilized upon any telecommunications network 12 capable of transmitting data including voice data and other types of electronic data. Examples of suitable telecommunications networks 12 for the various embodiments include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The various embodiments may communicate via a single telecommunications network 12 or multiple telecommunications networks 12 concurrently. Various protocols may be utilized by the electronic devices for communications such as but not limited to HTTP, SMTP, FTP and WAP (wireless Application Protocol). The various embodiments may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The various embodiments may also be utilized with online services and internet service providers.

The Internet is an exemplary telecommunications network 12 for the various embodiments. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

C. Central Communication Unit (20)

The central communication unit 20 may be comprised of any central communication site where communications are preferably established with. The central communication units 20 may be comprised of a server computer, cloud based computer, virtual computer, home computer or other computer system capable of receiving and transmitting data via IP networks and the telecommunication networks 12. As can be appreciated, a modem or other communication device may be required between each of the central communication units 20 and the corresponding telecommunication networks 12. The central communication unit 20 may be comprised of any electronic system capable of receiving and transmitting information (e.g. voice data, computer data, etc.).

D. Mobile Device (14)

The mobile device 14 may be comprised of any type of computer for practicing the various aspects of the various embodiments. For example, the mobile device 14 can be a personal computer (e.g. APPLE® based computer, an IBM based computer, or compatible thereof) or tablet computer (e.g. IPAD®). The mobile device 14 may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The mobile device 14 may be comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the various embodiments. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor together with an operating system operate to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

E. Main Tank (16)

Figure 2:
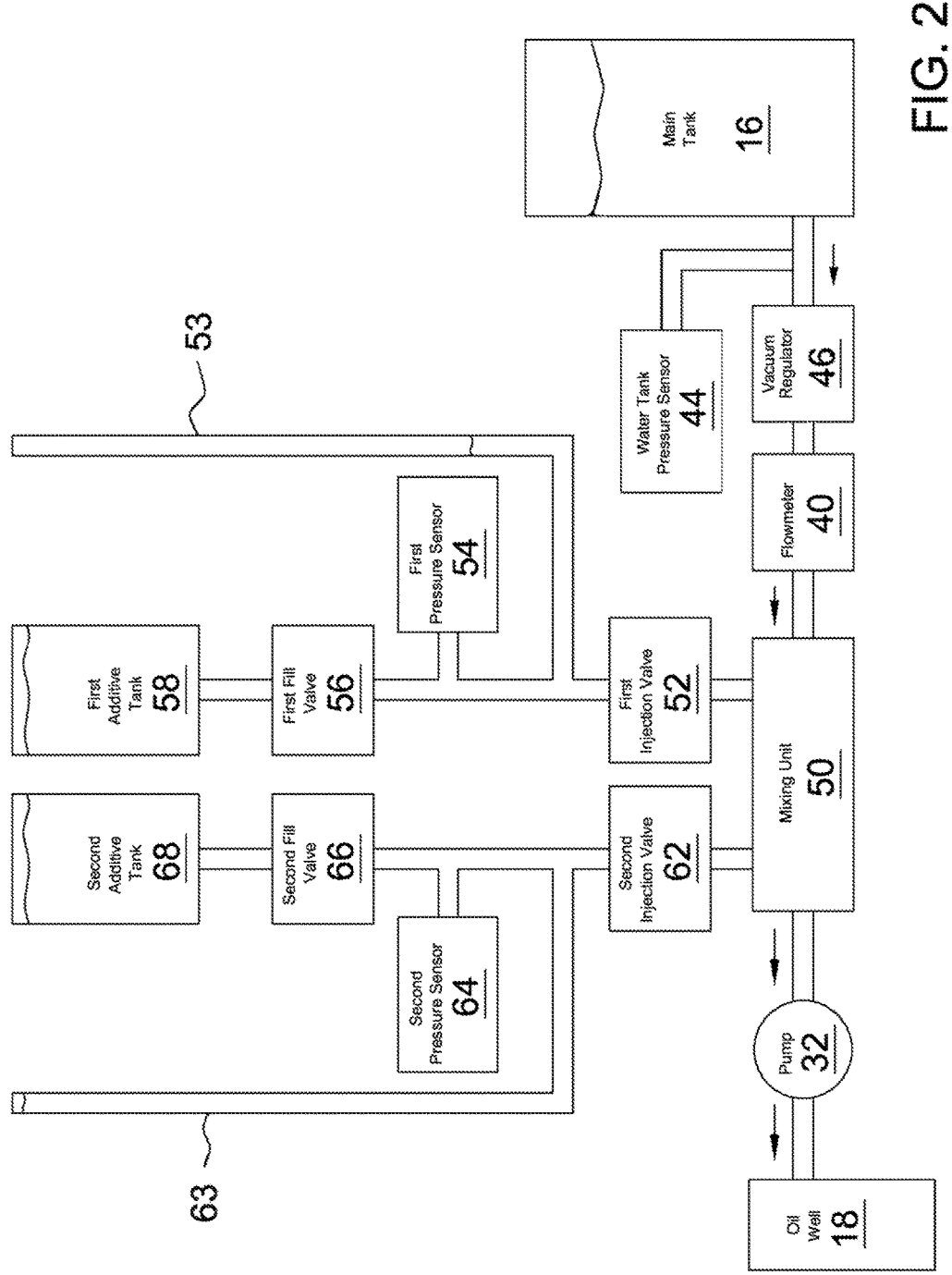
FIG. 2 is a block diagram illustrating the fluid communications between the various components of the first embodiment utilizing a mixing unit.
Figure 3:
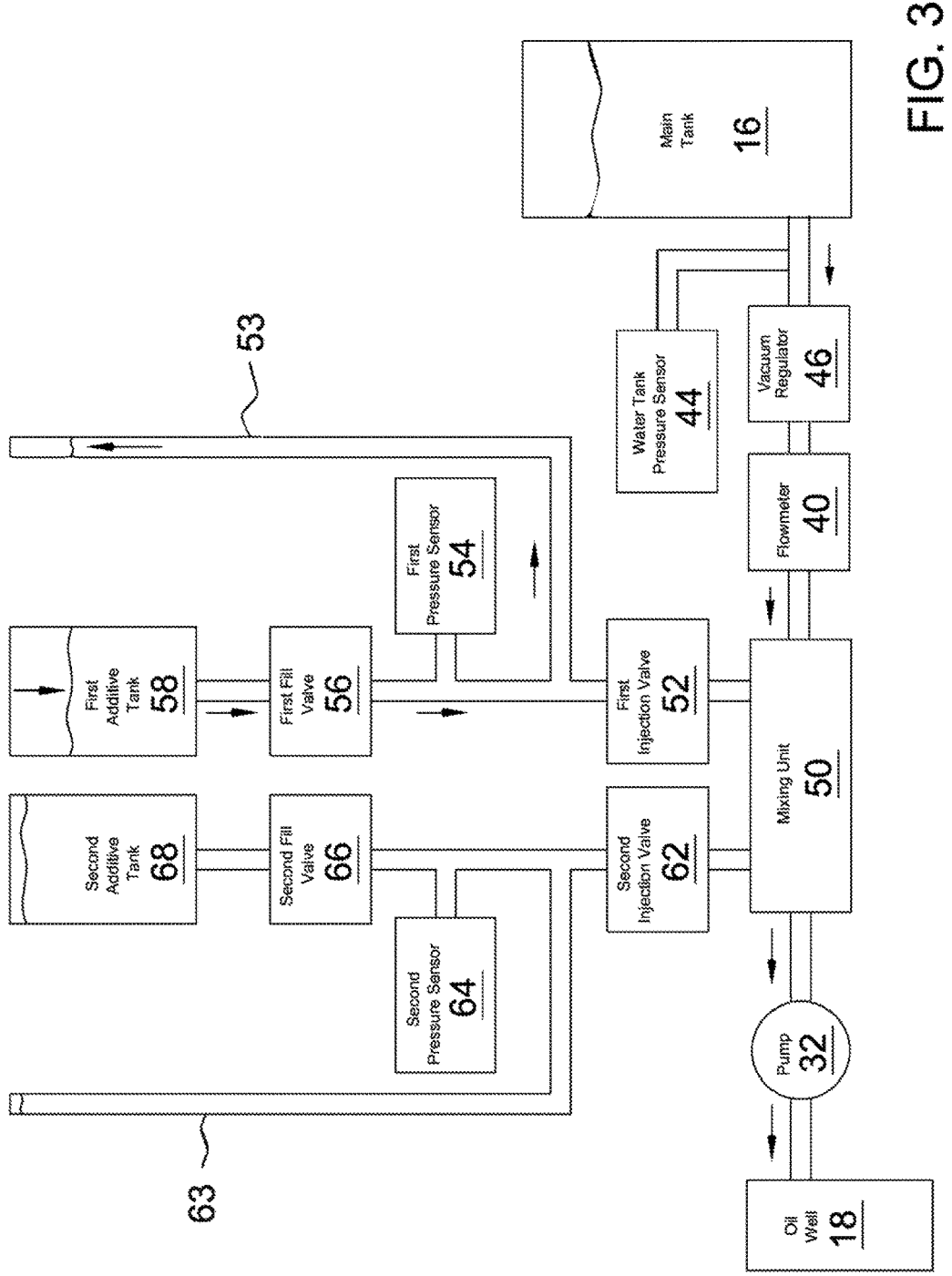
FIG. 3 is a block diagram illustrating the filling process wherein the first measuring tube is filled with the first fluid.
Figure 4:
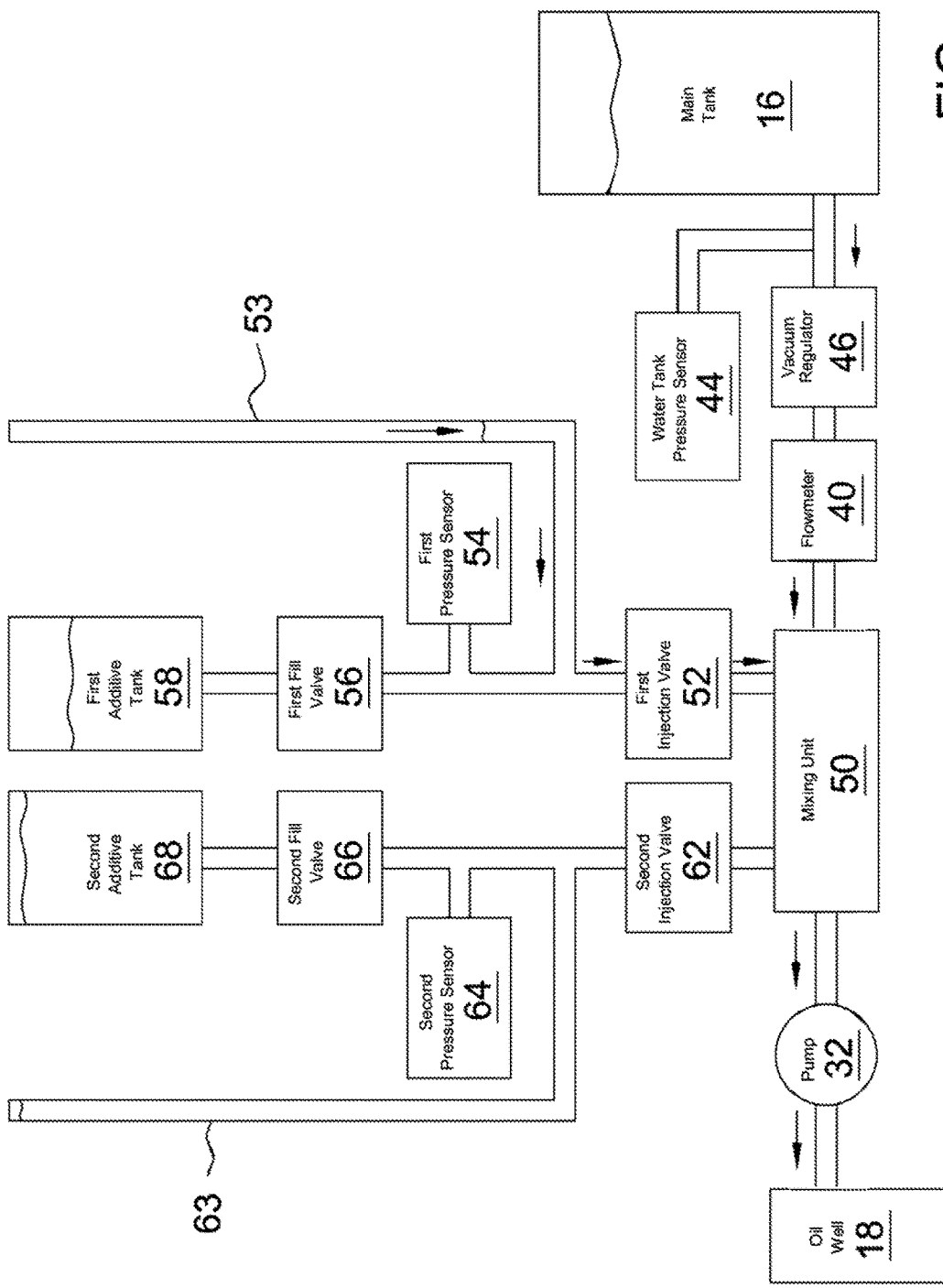
FIG. 4 is a block diagram illustrating the dosage process wherein the first fluid is dispensed from the first measuring tube into the mixing unit.
Figure 5:
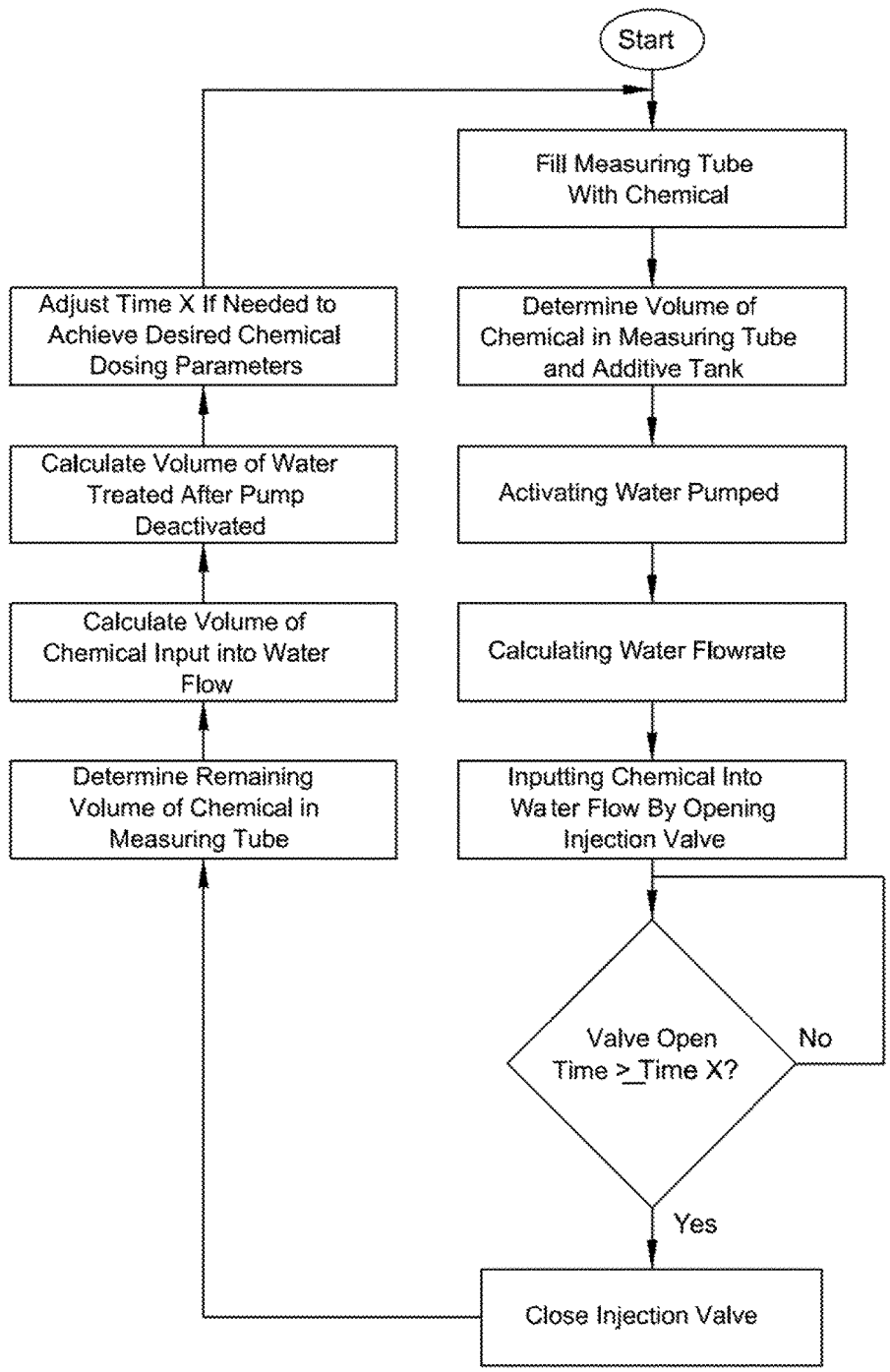
FIG. 5 is a flowchart illustrating the overall functionality of the first embodiment.
Figure 6:
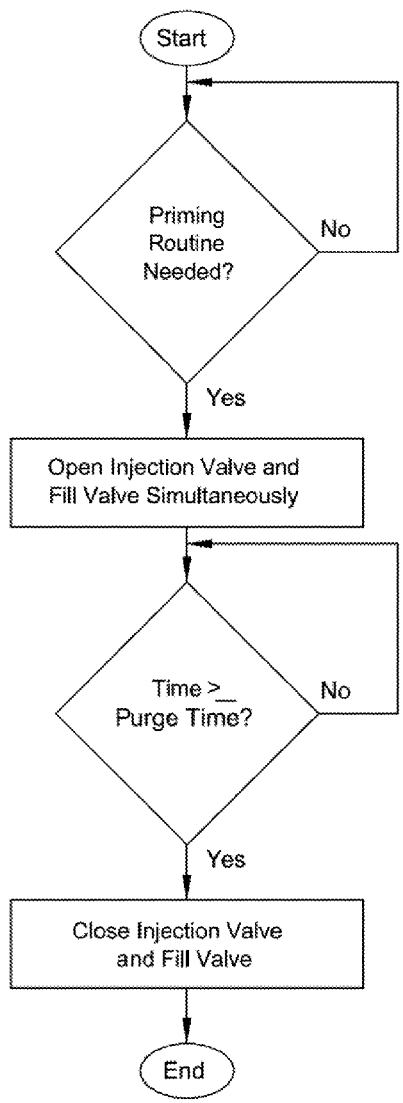
FIG. 6 is a flowchart illustrating the priming routine to purge air from the system.
Figure 7:
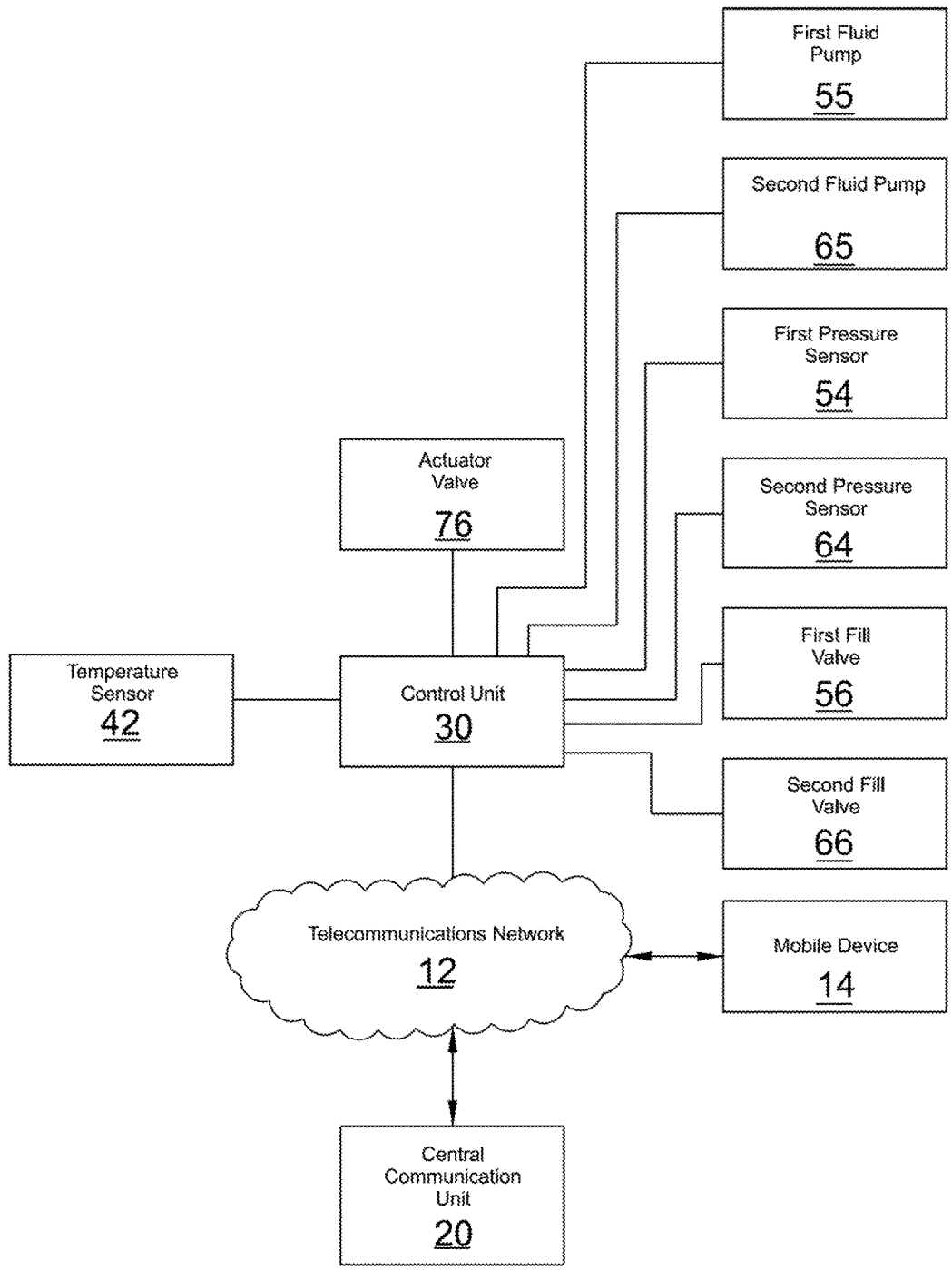
FIG. 7 is a block diagram illustrating the communications between the various components of a second embodiment.

FIGS. 2 through 4 illustrate the main tank 16 which stores a main fluid such as, but not limited to, water. The storage volume for the main tank 16 is preferably significantly larger than the storage volume for the additive tanks 58, 68. The main tank 16 may be comprised of a stationary tank, a mobile tank, a pressurized fluid source such as a municipal water supply system or the like. The phrase "main tank 16" as used herein is not limited to a conventional liquid tank and may be comprised of any device or system capable of providing the main fluid for chemical treatment.

A vacuum regulator 46 is fluidly connected to the flowmeter 40. The flowmeter 40 is fluidly connected to the mixing unit 50 and in communication with the control unit 30 to provide a flow rate of the main fluid to the control unit 30 thereby allowing for the calculation of the total volume of main fluid that has passed through the flowmeter 40 over a period of time. The flowmeter 40 is preferably fluidly connected between the vacuum regulator 46 and the mixing unit 50 as illustrated in FIGS. 2 through 4, however, the flowmeter 40 may be positioned on the discharge side of the mixing unit 50. A water tank pressure sensor 44 is fluidly connected to the mixing unit 50 to determine the water level within the main tank 16. The water tank pressure sensor 44 is in communication with the control unit 30 as illustrated in FIG. 1 of the drawings.

F. Mixing Unit (50)

FIGS. 2 and 3 further illustrate the mixing unit 50 fluidly connected to the main tank 16 and to the additive tanks 58, 68. The mixing unit 50 may be comprised of a manifold or a venturi tube. If a manifold is used, it is preferable to utilize a vacuum regulator 46 to provide a vacuum that draws in the first fluid from the first measuring tube 53 and the second fluid from the second measuring tube 63. This will increase suction at the inlet ports of the manifold which will in turn draw the chemical into the mixing unit 50 when the water pump 32 is turned on.

Alternately, a venturi tube can be used for the mixing unit 50 to provide a vacuum that draws in the first fluid from the first measuring tube 53 and the second fluid from the second measuring tube 63. When utilizing a venturi tube for the mixing unit 50, the venturi tube may be fluidly connected in a bypass waterline thereby reducing the pressure drop in the main water line. In addition, a valve can be placed in the main water line to force water to flow more rapidly through the venturi tube in the bypass line to increase the suction at the inlet ports of the venturi tube. Alternatively, the bypass line with the venturi tube within could be positioned either before or after the water pump 32 as opposed to being placed parallel to the water pump 32.

G. Pump (32)

FIG. 2 further illustrates a pump 32 fluidly connected to the mixing unit 50. The pump 32 may be comprised of any device capable and adapted to moving a volume of liquid. The pump 32 is in communication with the control unit 30 and may be controlled by the control unit 30 or another control device. The intake of the pump 32 is fluidly connected to the outlet of the mixing unit 50. The outlet of the pump 32 is fluidly connected to the oil well 18 to inject the chemically treated water into the oil well 18. As is well known in the oil industry, a first volume of chemically treated water is injected into the oil well 18 (e.g. 30 barrels) and a second volume of dilute well water is pumped out (e.g. 120 barrels). When determining a desired chemical treatment ratio, the user calculates the amount of water to be treated based on the total volume of water being removed from the oil well 18. The water being injected into the well 18 acts as a carrier for the total volume of water to be treated.

H. First Chemical Additive System

FIG. 2 illustrates a first additive tank 58 capable and adapted for storing a volume of the first fluid. The first additive tank 58 may be comprised of any tank capable of storing fluid. The first fluid is comprised of a liquid water treatment chemical for treating the water prior to injection into an oil well 18 such as, but not limited to, a scale inhibitor, a corrosion inhibitor, a desalination chemical and/or a biocide.

The first additive tank 58 is fluidly connected to the mixing unit 50 with the first fill valve 56 and the first injection valve 52 fluidly connected inline between thereof as shown in FIG. 2 of the drawings. The first fill valve 56 and the first injection valve 52 selectively isolate the first additive tank 58 from the mixing unit 50 to allow for filling and dispensing of the measuring tube.

As further shown in FIG. 2, the first measuring tube 53 is fluidly connected to the first additive tank 58. The first fill valve 56 is fluidly connected between the first measuring tube 53 and the first additive tank 58 to allow for isolation of the first fluid within the first measuring tube 53 after being filled and during dispensing of the first fluid from the first measuring tube 53 into the mixing unit 50.

The first measuring tube 53 is comprised of an upwardly angled tube and further is preferably substantially vertically orientated as illustrated in FIG. 2 of the drawings. The first measuring tube 53 is fluidly connected to the first additive tank 58 such that when the first fill valve 56 is opened, the fluid level within the first measuring tube 53 is approximately the same as the fluid level within the first additive tank 58 as illustrated in FIG. 2 of the drawings.

The first measuring tube 53 is preferably comprised of a small width tube. The first measuring tube 53 may have various internal cross sectional shapes for the internal passage such as circular, square, rectangular, oval and the like. However, it is preferable that the first measuring tube 53 be comprised of a constant interior cross sectional shape and further is preferably comprised of a circular interior shape to provide for relatively simple calculation of the volume of liquid within the first measuring tube 53. The first measuring tube 53 preferably has an interior width of less than 0.5 inches and has a vertical length of at least 2 feet. The first measuring tube 53 further preferably has a circular cross sectional shape, an interior diameter of approximately 0.375 inches and a vertical length of approximately 3 feet. The small diameter of the measuring tube combined with the long length of the tube allows for accurate measurement of the liquid within the first measuring tube 53 after filling the first measuring tube 53 and after dispensing the liquid from the first measuring tube 53. The dimensions of this measuring tube can be adjusted to accommodate different volumes of liquid required to be metered.

The first fill valve 56 is fluidly connected between the first additive tank 58 and the first measuring tube 53 as shown in FIG. 2. The first injection valve 52 is fluidly connected between the first measuring tube 53 and the mixing unit 50 as further shown in FIG. 2. The first fill valve 56 and the first injection valve 52 may be comprised of any electronic valve electrically controllable by the control unit 30. The first fill valve 56 and the second fill valve 66 each have an open state to allow for liquid flow and closed state to prevent liquid flow with respect to each valve. The first fill valve 56 and the first injection valve 52 are independently controlled by the control unit 30.

A first sensor 54 is fluidly connected to the first measuring tube 53 to determine a first fluid level of the first fluid within the first measuring tube 53. The first sensor 54 is in communication with the control unit 30 and transmits to the control unit 30 the first fluid level within the first measuring tube 53 either periodically, continuously and/or upon request of the control unit 30. The first sensor is preferably comprised of a first pressure sensor 54 that measures a first pressure of the first fluid within the first measuring tube 53. The first pressure sensor 54 is preferably fluidly connected to a bottom, a lower portion or below the first measuring tube 53 to acquire an accurate reading of the total volume of fluid within the first measuring tube 53.

I. Second Chemical Additive System

As discussed previously, the various embodiments may add one, two or more liquid chemicals into the main fluid from the main tank 16. FIG. 2 illustrates the usage of a second additive tank 68 storing a second fluid (the second fluid is preferably different from the first fluid but they may be the same), a second measuring tube 63, a second fill valve 66, a second pressure sensor 64, and a second injection valve 62 similar to the first chemical additive system discussed previously. The configuration and operation of the second chemical additive system is the same as the first chemical additive system with the exception of different chemical ratios for different types of liquid chemicals.

J. Control Unit (30)

The control unit 30 may be comprised of any type of computer for practicing the various aspects of the various embodiments including a conventional computer. For example, the control unit 30 can be an industrial automation controller, a programmable logic controller (PLC), a personal computer (e.g. APPLE® based computer, an IBM based computer, or compatible thereof) or tablet computer (e.g. IPAD®). The control unit 30 may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The control unit 30 is in communication with the first fill valve 56 and the first injection valve 52 as shown in FIG. 1 of the drawings. The control unit 30 controls the state of the first fill valve 56 and the first injection valve 52 for a fill process, a dosage process and a priming process as discussed herein. The below discussion discusses the first chemical additive system, but it can be appreciated that the same functionality is used for the second chemical additive system and any additional chemical additive systems. The control unit 30 has a first cycle of the fill process and the dosage process followed by a second cycle, a third cycle, a fourth cycle, a fifth cycle and so forth of the fill process and the dosage process.

K. Fill Process—First Embodiment

The fill process for the first embodiment involves filling the first measuring tube 53 so that the first measuring tube 53 includes a volume of liquid similar to the first additive tank 58 as shown in FIG. 3. During the fill process, the control unit 30 opens the first fill valve 56 and closes the first injection valve 52 thereby filling the first measuring tube 53 with the first fluid from the first additive tank 58 in isolation from the mixing unit 50 using only the fluid pressure from the first additive tank 58 which eventually equals out when the respective fluid levels are the same as shown in FIG. 3. The fill process is set to last a period of time sufficient to fill the first measuring tube 53 assuming the first measuring tube 53 was empty and the first additive tank 58 completely full. Alternatively, the fill process may be set to last a period of time determined to generally allow an approximate volume of first fluid into the first measuring tube 53 (e.g. 4 cubic inches).

L. Dosage Process—First Embodiment

The dosage process involves dispensing all or a portion of the first fluid within the first measuring tube 53 into the main fluid within the mixing unit 50. During the dosage process, the control unit 30 closes the first fill valve 56 and then opens the first injection valve 52 thereby adding the first fluid from the first measuring tube 53 to the main fluid within the mixing unit 50 as shown in FIG. 4 of the drawings. During the dosage process, the control unit 30 opens the first injection valve 52 for an open time period sufficient to release an estimated volume of the first fluid. The first fluid is preferably drawn into the mixing unit 50 with the negative pressure created from the pump 32. Hence, there is no need for a metering pump to provide the first fluid for adding to the water being treated. During the first cycle of the dosage process, a predetermined time such as 0.5 seconds may be used for the open time period. The open time period used to keep the first injection valve 52 open may be any time needed to dispense the desired volume of first fluid such as less than ⅛ of a second to more than 1 second.

M. Priming Process—First Embodiment

The priming process removes air and other gasses from the system. During the priming process, the control unit 30 opens the first fill valve 56 and opens the first injection valve 52 while the pump 32 is operating to purge gases from the chemical lines through the pump 32 (the same process may be used for the second chemical additive system). The priming process may be done once every day to purge the system of air or at any other predefined time.

N. Calculating Dispensed Volume of Fluid

The control unit 30 calculates an initial volume of the first fluid within the first measuring tube 53 based on the first fluid level after the fill process and before the dosage process. The control unit 30 calculates the remaining volume of the first fluid within the first measuring tube 53 based on the first fluid level after the dosage process. The control unit 30 calculates a dispensed volume of the first fluid by subtracting the remaining volume from the initial volume. The control unit 30 calculates the initial volume and the remaining volume of the first fluid using a first density of the first fluid which is known and entered by a user. In addition, the temperature measured by the temperature sensor 42 can be utilized to determine the volume of the first fluid based on expansion and contraction of the fluid at different temperatures (i.e. the change in density).

O. Adjusting Open Time Period Based on Actual Dosage Ratio

The control unit 30 calculates an actual dosage ratio of the first fluid added to the main fluid during the first cycle of the fill process and the dosage process. The control unit 30 compares the actual dosage ratio with a prescribed dosage ratio (set by the user as to the desired ratio of chemical to water in ppm).

If the actual dosage ratio is calculated by the control unit 30 to be less than the prescribed dosage ratio, the control unit 30 increases the open time period for a next cycle of the fill process and the dosage process which increases the amount of time that the first injection valve 52 is kept open thereby increasing the volume of first fluid dispensed from the first measuring tube 53. If the actual dosage ratio is more than the prescribed dosage ratio, the control unit 30 decreases the open time period for the next cycle of the fill process and the dosage process which decreases the amount of time that the first injection valve 52 is kept open thereby decreasing the volume of first fluid dispensed from the first measuring tube 53. If the actual dosage ratio is the same or approximately the same as the prescribed dosage ratio, then the control unit 30 keeps the open time period the same as the previous cycle.

P. Example for Adjusting Open Time Period

For example, if the prescribed dosage ratio for the first fluid is 100 ppm with respect to the main fluid, the various embodiments will adjust the open time period for the open time of the first injection valve 52 until the actual dosage ratio is approximately equal to 100 ppm. To further the example, if the actual dosage ratio after the first cycle is 80 ppm for the first fluid using a 0.5 second open time period for the first injection valve 52, the control unit 30 will increase the open time period an amount of time estimated to get close to the 100 ppm such as a 0.7 second open time period for the first injection valve 52. When the second cycle occurs, the actual dosage ratio is 110 ppm using the 0.7 second open time period. The control unit 30 then recalculates the open time period to keep the first injection valve 52 open for the third cycle by lowering the open time period to 0.6 seconds. During the third cycle, the actual dosage ratio is 100 ppm using the 0.6 second open time period, so the control unit 30 continues to use 0.6 seconds for the open time period until a future deviation occurs between the actual dosage ratio and the prescribed dosage ratio. This same process is used for the second chemical additive system and any additional chemical additive systems.

Q. Warning System

During operation of the various embodiments, if a condition is identified indicating the possibility of a problem such as low fluid levels in a tank 16, 58, 68, extreme fluctuations in the actual dosage ratio, a limited amount of chemical dispensed over a period of time, extreme temperatures, extreme pressures, low pressures, and the like, the control unit 30 communicates with the mobile device 14 via the telecommunications network 12 to indicate the type of problem experienced. The user with access to the mobile device 14 is thereby immediately alerted to the potential problem and may monitor the status of the system remotely or visit the site.

R. Overview of Second Through Sixth Embodiments (FIGS. 7-14)

The purpose of second through fifth embodiments shown in FIGS. 7 through 14 are to provide a fluid metering system that can dose fluids via an external fluid pump and provide extreme accuracy and historical data for fluid metering management without the use of a carrier fluid in which to entrain the metered fluid. These embodiments take electrical control of a simple fluid pump and then use the measuring tube described in the above first embodiment to accurately reach a target dose within a certain time period. Examples of suitable fluid pumps usable with the various embodiments include, but are not limited to, a piston pump, a diaphragm pump or gear pump. Check valves may also be used to prevent the backflow of chemical through the fluid pumps.

The second through sixth embodiments shown in FIGS. 7 through 14 utilize the same measuring tube system described in the above first embodiment to capitalize on the precision and accuracy technology of that system. The limitation of the first embodiment is that it needs a carrier fluid (e.g. water) to mix the metered fluid in a mixing chamber to entrain the metered fluid into the carrier fluid. The second through sixth embodiments shown in FIGS. 7 through 14 eliminate the need for a carrier fluid by using a fluid pump to move the metered fluid out of the measuring tube. The second through sixth embodiments shown in FIGS. 7 through 14 then control the metered fluid pump by electrically turning the pump on and off to meter a predetermined target or by electrically controlling the speed of the fluid pump.

The second through sixth embodiments shown in FIGS. 7 through 14 are preferably utilized within chemical treatment systems that treat an oil well 18, however, these embodiments may be utilized in any application where a liquid needs to be accurately metered. The second through fifth embodiments shown in FIGS. 7 through 13 may be utilized with one, two or more additive tanks 58, 68 depending upon the number of chemicals needed to treat a system. In addition, the second through sixth embodiments shown in FIGS. 7 through 14 may be utilized to treat one, two or more oil wells 18.

The various embodiments utilize a measuring tube 53, 63 that is filled with a chemical wherein a pressure sensor 54, 64 measures the pressure of the chemical in the measuring tube 53, 63 thereby allowing a control unit 30 to calculate the total volume of chemical in the measuring tube 53. After chemical is pumped from the measuring tube 53, 63 via the fluid pump 55, 65, the pressure sensor 54, 64 measures the remaining volume of chemical in the measuring tube 53, 63 to determine the total volume of chemical pumped. The chemical in the measuring tube 53, 63 is isolated from the overall system to provide accurate measurements of the amount of chemical in the measuring tube 53, 63.

The measuring tubes 53, 63 may have a width of at least 1 inch and a vertical length of at least 2 feet. However, the measuring tubes 53, 63 may have a width of less than 1 inch and a vertical length less than 2 feet. In one non-limiting preferred embodiment, the first measuring tube 53, 63 has a circular cross sectional shape having a diameter of approximately 1.625 inches and a vertical length of approximately 4 feet.

The first through sixth embodiments are not limited to oil and gas production wells. These embodiments can be used in any system where accurate and precise chemical treatment is needed and can be accomplished in short cycle non-continuous injections. Alternately, the control unit can cycle between a first and a second chemical additive system to provide near continuous injections into the same well.

S. Second Embodiment—Production Oil Well

Figure 8:
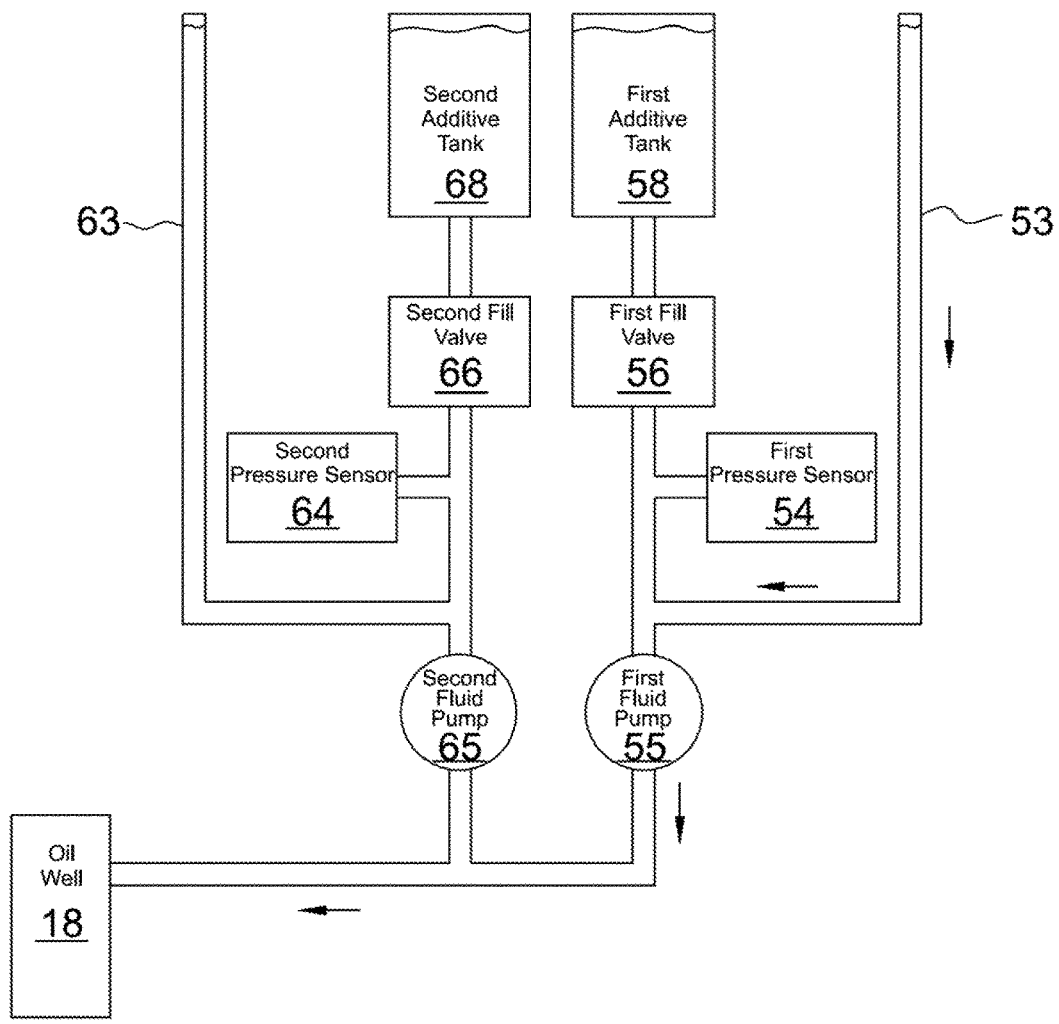
FIG. 8 is a block diagram illustrating the fluid communications between the various components of the second embodiment.
Figure 9:
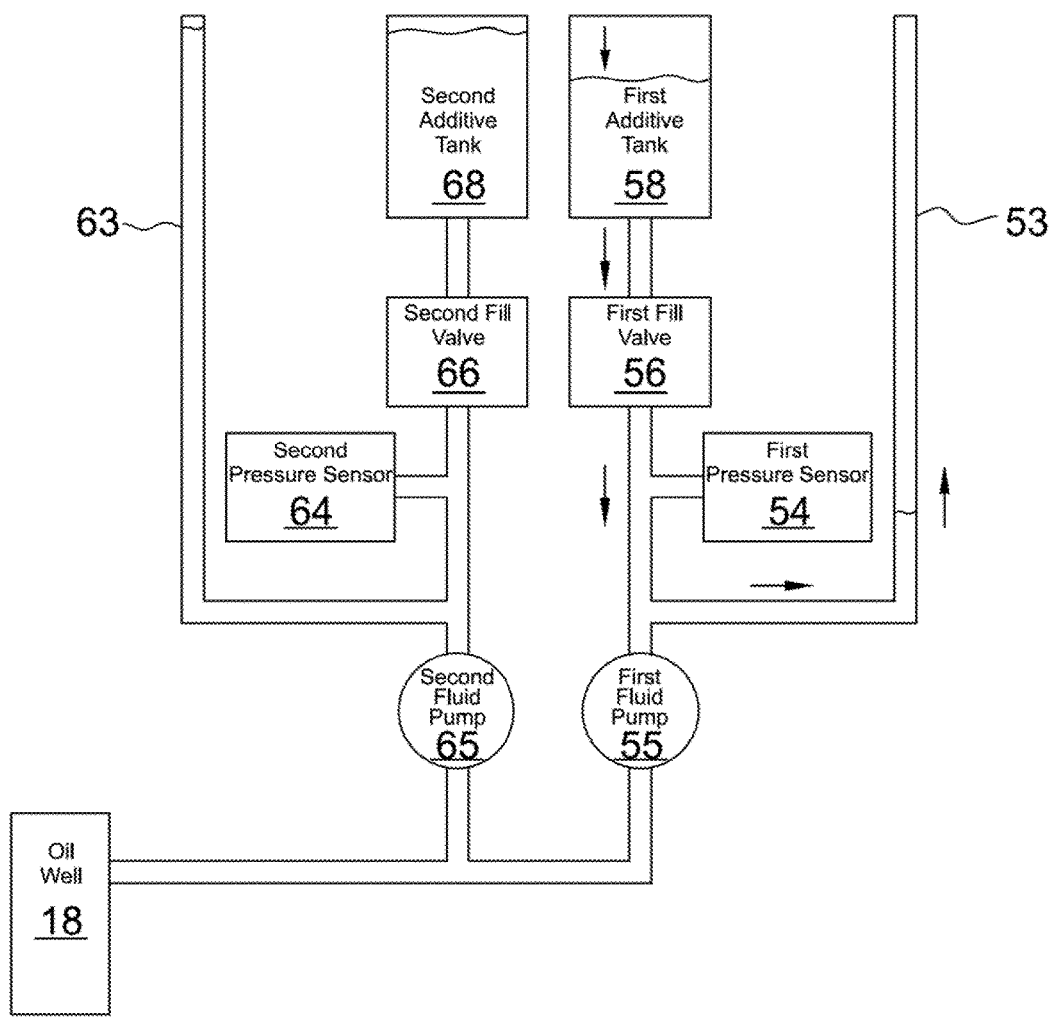
FIG. 9 is a block diagram illustrating the filling process wherein the first measuring tube is filled with the first fluid in the second embodiment.

FIG. 8 illustrates a second embodiment used with a production well where one or more liquid chemicals are transferred to the bottom of the oil well using a capillary string (small diameter tube) or by directly injecting the liquid chemicals between the tubing and casing of the oil well. As shown in FIG. 8, the second embodiment is comprised of a first additive tank 58, first fill valve 56, a first pressure sensor 54, a first measuring tube 53, and a first fluid pump 55. All components are fluidly plumbed according to FIG. 8. The first fill valve 56, first pressure sensor 54, and first fluid pump 55 are electrically connected to the control unit 30.

As further shown in FIG. 8, the second embodiment may include a second additive tank 68, second fill valve 66, a second pressure sensor 64, a second measuring tube 63, and a second fluid pump 65. All components are fluidly plumbed according to FIG. 8. The second fill valve 66, second pressure sensor 64, and second fluid pump 65 are electrically connected to the control unit 30.

While two liquid chemicals are being shown, it can be appreciated that a third additive tank or more may be used along with the similar components to add additional chemicals. This arrangement of components comprises a single station of the second embodiment. The control unit 30 can control as many stations as is necessary in order to treat multiple chemicals and/or multiple oil wells and/or to provide continuous treatment by alternating injections from each station into the same well.

The fluid metering system generally includes a closed loop feedback system that monitors the flow rate of the fluid pump 55, 65 and the volume of liquid chemical pumped over a period of time. Based on the measured amount of chemical pumped over a period of time, the system calculates whether or not an adjustment is required for the next cycle time of the pump or if the speed of a variable speed pump needs to be adjusted. The fluid pump 55, 65 is of such configuration that no liquid chemical can flow through the pump 55, 65 when in a "pump off" mode (pump is deactivated). Liquid chemical can only flow through the pump 55, 65 when the pump is activated during a "pump on" mode (pump is activated). For fluid pumps that do allow fluid to flow through it while in the off state, an injection valve 57, 67 can be plumbed to open and close respectively as the fluid pump 55, 65 is turned on and off thereby eliminating fluid from flowing from the measuring tube 53 when the fluid pump 55, 65 is off as shown in the fifth embodiment in FIG. 12.

As discussed with respect to the first embodiment above, the control unit 30 calculates an initial volume of the first fluid within the first measuring tube 53 based on the first fluid level after the fill process and before the dosage process. The control unit 30 calculates the remaining volume of the first fluid within the first measuring tube 53 based on the first fluid level after the dosage process. The control unit 30 calculates a dispensed volume of the first fluid by subtracting the remaining volume from the initial volume. The control unit 30 calculates the initial volume and the remaining volume of the first fluid using a first density of the first fluid which is known and entered by a user. In addition, the temperature measured by the temperature sensor 42 can be utilized to determine the volume of the first fluid based on expansion and contraction of the fluid at different temperatures (i.e. the change in density).

The control unit 30 calculates an actual dosage of the first fluid during the first cycle of the fill process and the dosage process. The control unit 30 compares the actual dosage with a prescribed dosage (set by the user as to the desired ratio of chemical to water in ppm).

If the actual dosage is calculated by the control unit 30 to be less than the prescribed dosage, the control unit 30 increases the open time period for a next cycle of the fill process and the dosage process (or increases the speed of the pump) which increases the amount of time that the first injection valve 52 is kept open thereby increasing the volume of first fluid dispensed from the first measuring tube 53. If the actual dosage is more than the prescribed dosage, the control unit 30 decreases the open time period for the next cycle of the fill process and the dosage process (or decreases the speed of the pump) which decreases the amount of time that the first injection valve 52 is kept open thereby decreasing the volume of first fluid dispensed from the first measuring tube 53. If the actual dosage is the same or approximately the same as the prescribed dosage, then the control unit 30 keeps the open time period (or speed of the pump) the same as the previous cycle. This same process for calculating the actual dosage to determine how to adjust the pumps 55, 65 may also be used with all of the other embodiments disclosed herein.

T. Third Embodiment—Production Oil Well with Slip Stream

Figure 10:
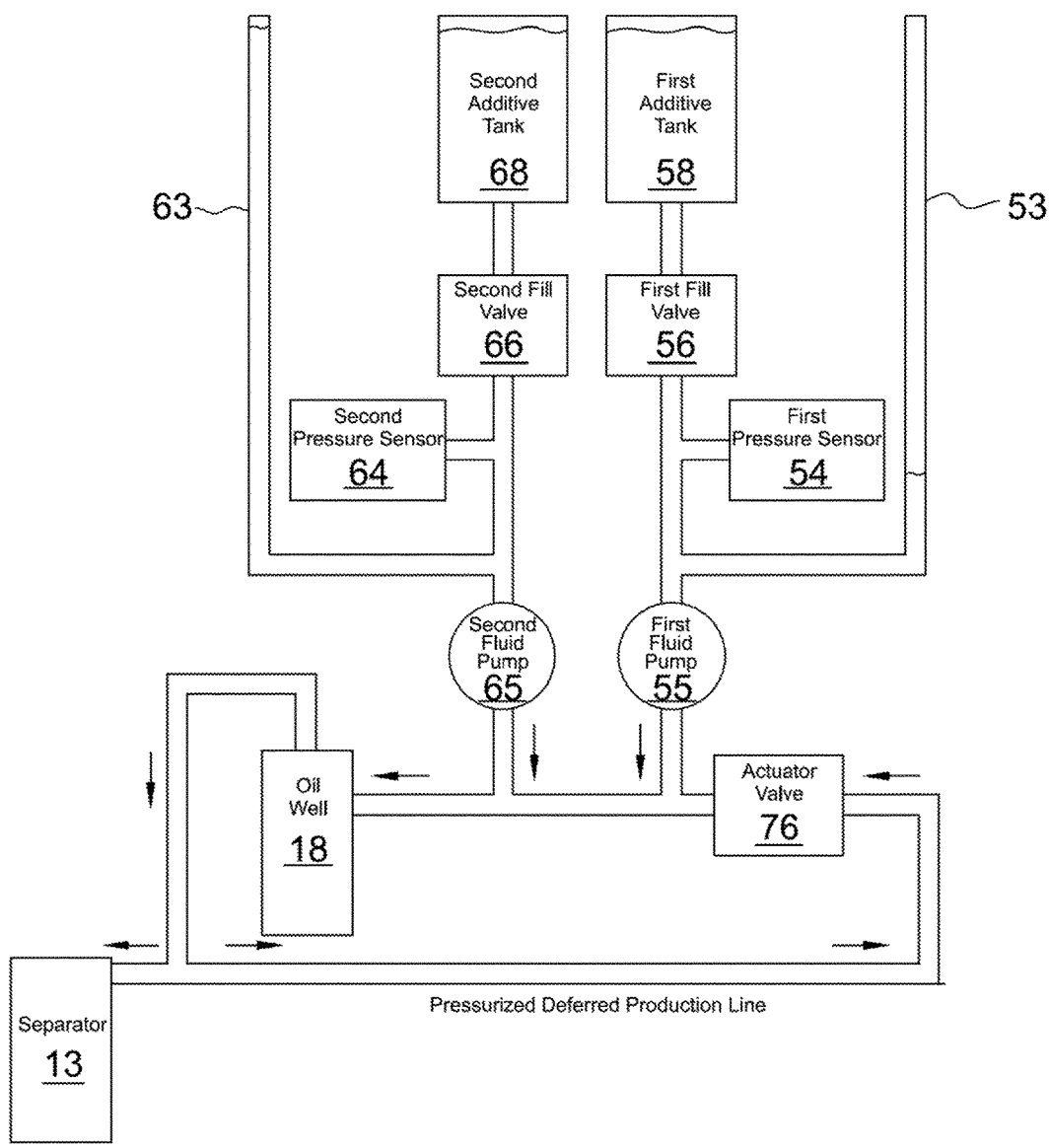
FIG. 10 is a block diagram illustrating the fluid communications between the various components of a third embodiment.

A third embodiment for a production well with slip stream is shown in FIG. 10. Oil wells often use pressurized deferred production fluid from the well to carry liquid chemical back down the well. This is called a slip stream configuration. Currently these wells flow this deferred production continuously thereby losing the oil that is mixed with the fluid back down the well which results in lost revenues as high as $90,000 per year per well.

The third embodiment can control an actuator valve 76 that will turn off the deferred production flow whenever the fluid or chemical pump 55 is not running thereby saving up to 90% of the deferred production. The controller will sequence the actuator valve 76 in unison with the fluid pump and limit the cycles to a predetermined number of times per hour or per day thereby reducing the amount of deferred production substantially.

The third embodiment shown in FIG. 10 can greatly reduce deferred production on a slip stream well by opening and closing the actuator valve 76 plumbed in line with the slip stream production fluid when turning the chemical pump on and off. The actuator valve 76 controls or limits the flowrate of the deferred production fluid that is returned down to the oil well (e.g. between 1-5% of the total production fluid from the oil well 18 is returned back down into the oil well).

The pump from the oil well 18 draws the production fluid (combination of oil, gas and water) where a large percentage (95%-99%) is transferred to a separator 13 and the remaining percentage (e.g. 1-5%) is a pressurized deferred production fluid that passes through the actuator valve 76 at a controlled rate (or by opening/closing the actuator valve 76 selectively). The fluid pump 55, 65 injects the liquid chemical(s) into the pressurized deferred production fluid (before or after the actuator valve 76) where the liquid chemical is then transferred back down into the oil well 18 between the tubing and casing to treat the components of the oil well 18.

U. Fourth Embodiment—Salt Water Disposal Well

Figure 11:
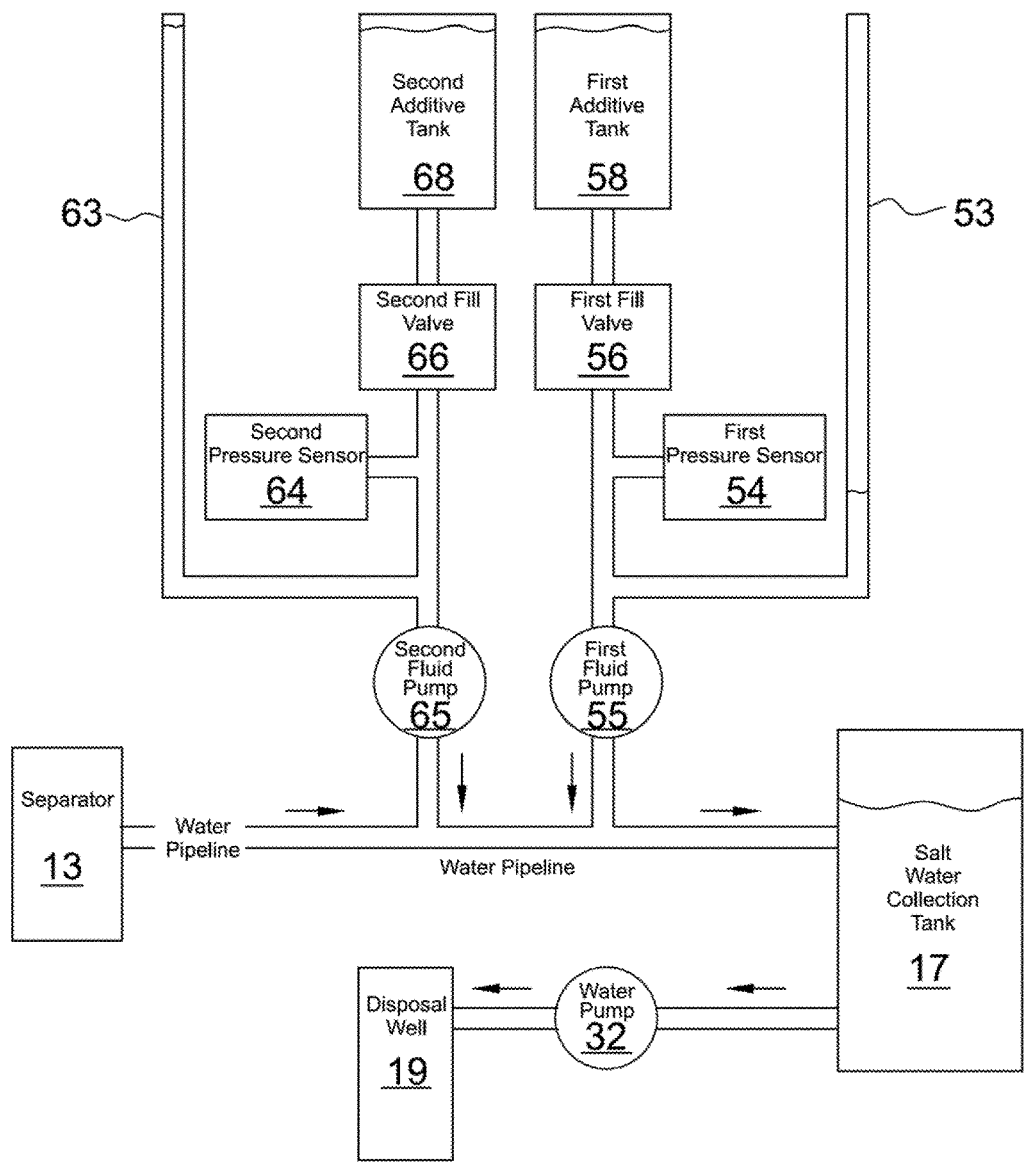
FIG. 11 is a block diagram illustrating the fluid communications between the various components of a fourth embodiment.

FIG. 11 illustrates a fourth embodiment of the invention where salt water separated by a separator 13 or other device is transferred to a salt water collection tank 17. There are many salt water disposal wells 19 needed to pump unwanted salt water production fluid back into the ground. This salt water typically arrives at a salt water disposal facility either by a pipeline or by trucks and is stored temporarily in salt water collection tanks 17. This salt water must be chemically treated before it is pumped down the disposal well 19 (e.g. an old oil well). The problem is that the amount of salt water arriving at the facility can vary greatly from day to day. A salt water disposal well may receive 5000 barrels of water one day and 30,000 barrels the next day. Typically this water is treated by taking an average of the amount of salt water to be treated over a week, month, or quarter. In some cases the peak volume of saltwater is treated to ensure corrosion or scaling does not occur. The resulting over and under treatment in such situations can be enormous resulting in scale and corrosion buildup in under-treatment scenarios or hundreds of gallons of unused chemical being pumped down the well in over-treatment scenarios.

The fourth embodiment in FIG. 11 can be configured to inject chemical into a pipeline or directly into the salt water collection tanks 17 precisely and accurately by monitoring the flow rate of the saltwater entering the facility and adjusting the target in real time. Typically the facility control unit communicates this information via a telecommunications network. The fluid pump 55, 65 injects the liquid chemical(s) into the salt water as it is being transferred or when it is within the salt water collection tank 17 (or even after the salt water leaves the salt water collection tank 17).

The fourth embodiment shown in FIG. 11 can greatly improve the efficiency of chemically treating water in a salt water disposal well by adjusting the chemical dosage target in real time by monitoring the flow rate of a pipeline or truck offloads.

V. Fifth Embodiment—Using Injection Valves

Figure 12:
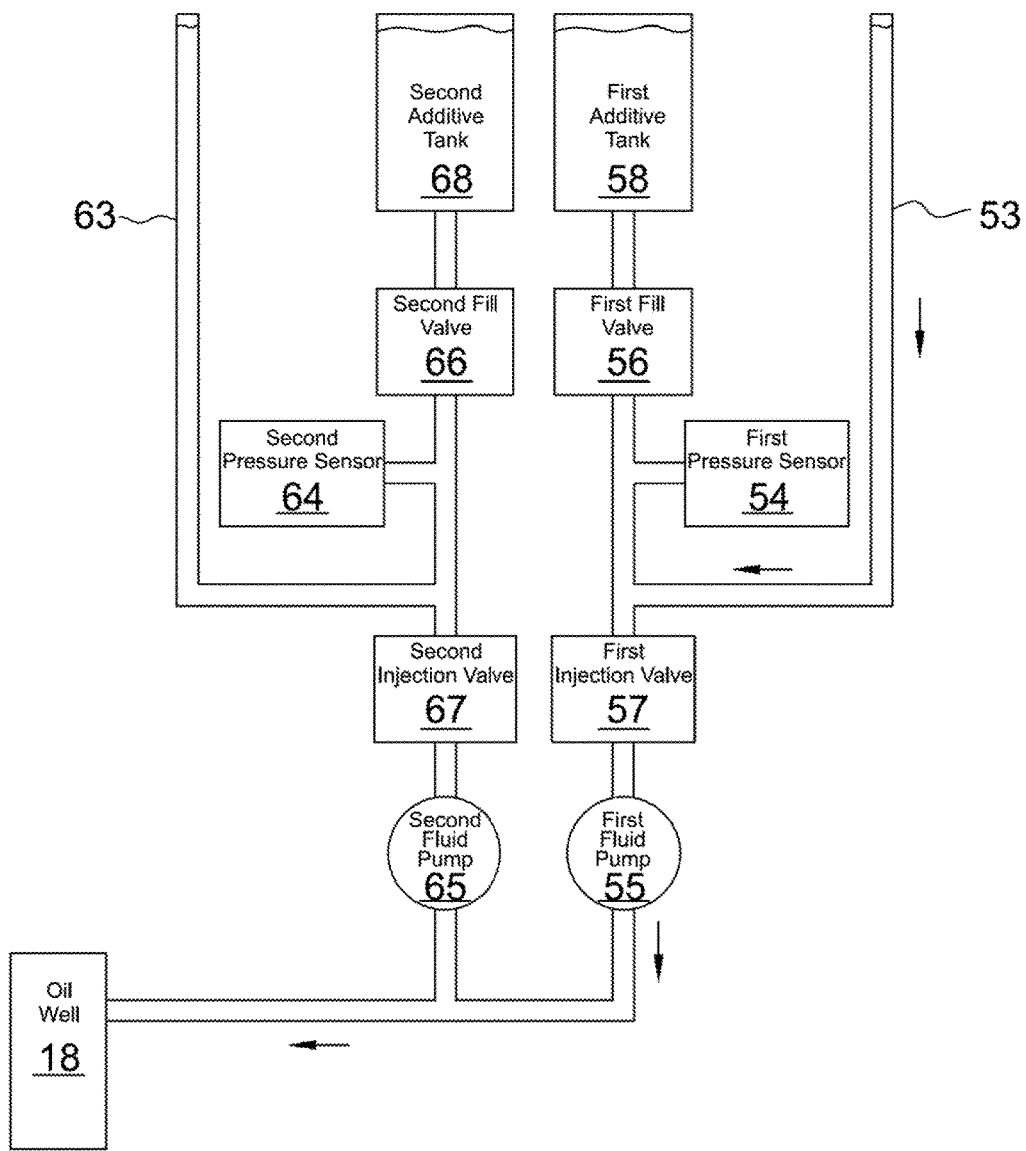
FIG. 12 is a block diagram illustrating the fluid communications between the various components of a fifth embodiment.

As shown in FIG. 12, a fifth embodiment may include a first injection valve 57 plumbed between the first measuring tube 53 and the first fluid pump 55 so that fluid cannot not free-flow (or backflow) through the first fluid pump 55 when not operating. As further shown in FIG. 12, the fifth embodiment may include a second injection valve 67 plumbed between the second measuring tube 63 and the second fluid pump 65 so that fluid cannot not free-flow (or backflow) through the second fluid pump 65 when not operating. The injection valves 57, 67 may be comprised of any type of valve that prevents the flow of liquid in either direction. The use of injection valves 57, 67 may be used on all of the embodiments disclosed herein along with check valves.

W. Sixth Embodiment—Treating Gas

Once the production fluid is drawn to the surface from the oil well 18, the production fluid is separated into oil, water and gas. The separated gas is transported to a gas plant for processing via pipeline; however, if no pipeline is available, the gas is burned off via a flare. Often, natural gas may be treated with methanol to prevent the freezing of precipitated water within the gas line which can result in damage to the gas transfer system. Additionally, untreated hydration can freeze and completely block the gas line. The separated gas may also be treated with, but is not limited to, an H2S liquid scavenger to convert any hydrogen sulfide to a non-lethal form.

Figure 13:
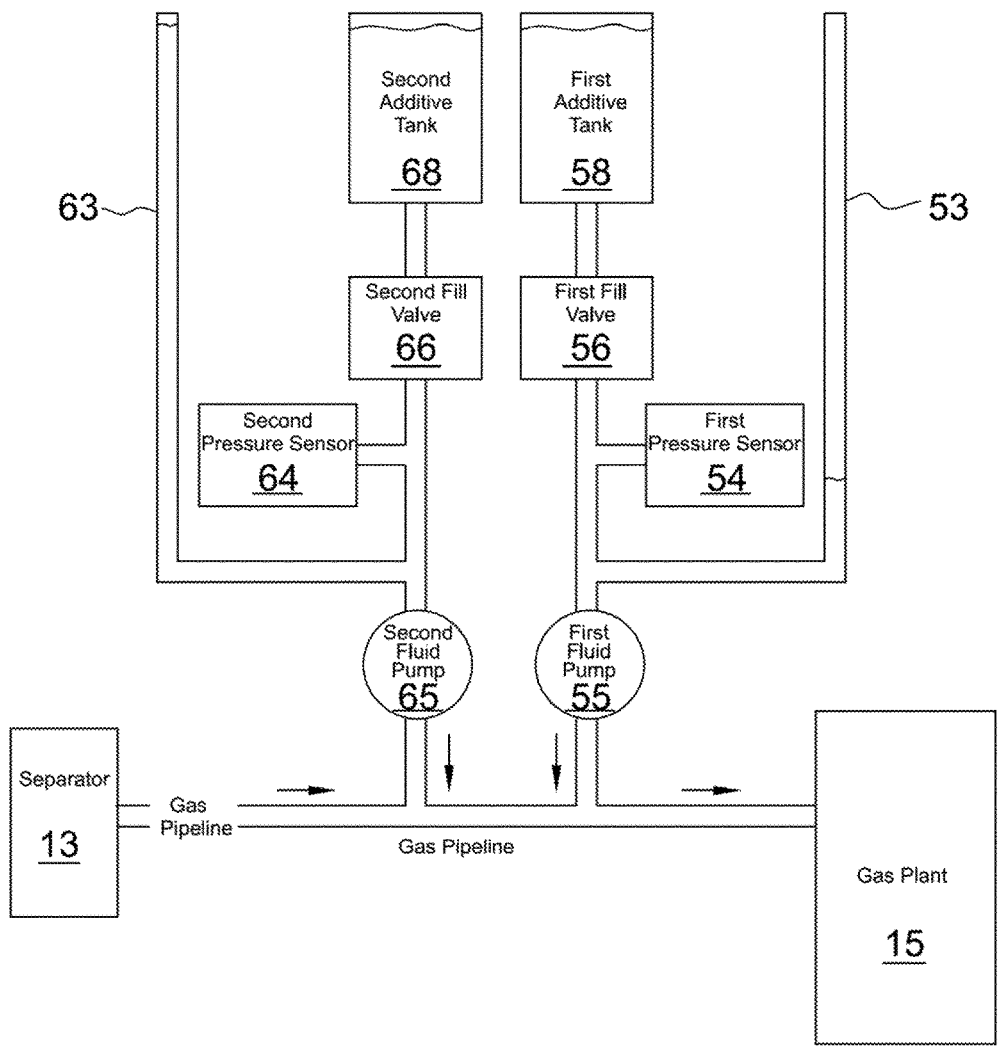
FIG. 13 is a block diagram illustrating the fluid communications between the various components of a sixth embodiment.
Figure 14:
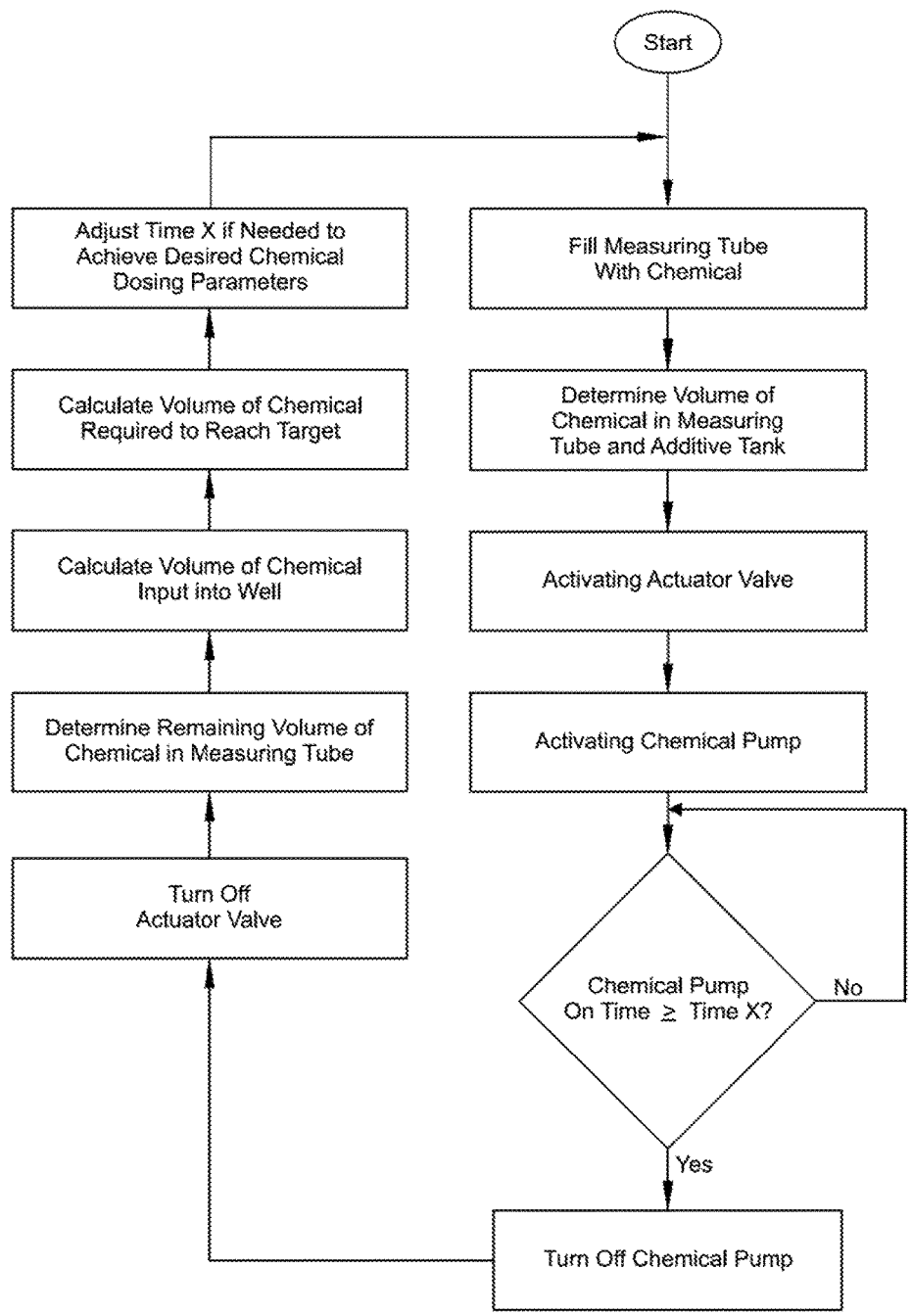
FIG. 14 is a flowchart illustrating the overall functionality of the second embodiment, third embodiment, fourth embodiment, fifth embodiment and sixth embodiment.

The sixth embodiment shown in FIG. 13 illustrates a configuration used to treat the gas with a liquid chemical (e.g. methanol, H2S liquid scavenger) prior to transferring to a gas plant or other location. The pump 55, 65 injects one or more liquid chemicals (e.g. methanol, H2S liquid scavenger) into the pipeline to treat the gas.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

The various embodiments of the various embodiments is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions. The various embodiments may be embodied in other specific forms without departing from the spirit or essential attributes thereof, and it is therefore desired that the present embodiment be considered in all respects as illustrative and not restrictive. Many modifications and other embodiments of the invention will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the various embodiments, suitable methods and materials are described above. Thus, the various embodiments are not intended to be limited to the embodiments shown, but is to be accorded the widest scope consistent with the principles and features disclosed herein.

What is claimed is:

1. A fluid metering system for chemically treating an oil well, comprising:
   a first additive tank storing a first fluid;
   a first measuring tube fluidly connected to the first additive tank;
   a first fill valve fluidly connected between the first additive tank and the first measuring tube;
   a first fluid pump, wherein an inlet of the first fluid pump is fluidly connected to the first measuring tube and wherein an outlet of the first fluid pump is fluidly connected to an oil well; and
   a control unit in communication with the first fill valve and the first fluid pump, wherein the control unit controls a state of the first fill valve and the first fluid pump for a fill process and for a dosage process, wherein the control unit opens the first fill valve and deactivates the first fluid pump during the fill process thereby filling the first measuring tube with the first fluid, and wherein the control unit closes the first fill valve and activates the first fluid pump during the dosage process thereby transferring the first fluid from the first measuring tube to the oil well for treating the oil well.

2. The fluid metering system of claim 1, wherein the first fluid is comprised of a scale inhibitor, a corrosion inhibitor, a desalination chemical or a biocide.

3. The fluid metering system of claim 1, wherein during the dosage process, the control unit activates the first fluid pump for an on time period to release an estimated volume of the first fluid.

4. The fluid metering system of claim 3, including a first sensor fluidly connected to the first measuring tube to determine a first fluid level of the first fluid within the first measuring tube, wherein the first sensor is in communication with the control unit and transmits to the control unit the first fluid level, wherein the control unit calculates an initial volume of the first fluid within the first measuring tube based on the first fluid level after the fill process and before the dosage process, wherein the control unit calculates a remaining volume of the first fluid within the first measuring tube based on the first fluid level after the dosage process, and wherein the control unit calculates a dispensed volume of the first fluid by subtracting the remaining volume from the initial volume.

5. The fluid metering system of claim 1, wherein the control unit compares the actual dosage ratio with a prescribed dosage ratio, wherein the control unit increases the on time period for a next cycle of the fill process and the dosage process if the actual dosage ratio is less than the prescribed dosage ratio, and wherein the control unit decreases the on time period for the next cycle of the fill process and the dosage process if the actual dosage ratio is more than the prescribed dosage ratio.

6. The fluid metering system of claim 4, wherein the first sensor is comprised of a first pressure sensor that measures a first pressure of the first fluid within the first measuring tube.

7. The fluid metering system of claim 6, wherein the control unit calculates the initial volume and the remaining volume of the first fluid using a first density of the first fluid.

8. The fluid metering system of claim 6, wherein the first measuring tube is comprised of an upwardly angled tube.

9. The fluid metering system of claim 6, wherein the first measuring tube is vertically orientated.

10. The fluid metering system of claim 9, wherein the first measuring tube having a width of at least 1 inch and a vertical length of at least 2 feet.

11. The fluid metering system of claim 10, wherein the first measuring tube has a circular cross sectional shape having a diameter of approximately 1.625 inches and a vertical length of approximately 4 feet.

12. The fluid metering system of claim 6, wherein the first pressure sensor is fluidly connected to a lower portion of the first measuring tube.

13. The fluid metering system of claim 1, including:
   a second additive tank storing a second fluid, wherein the second fluid is different from the first fluid;
   a second measuring tube fluidly connected to the second additive tank;
   a second fill valve fluidly connected between the second additive tank and the second measuring tube; and
   a second fluid pump, wherein an inlet of the second fluid pump is fluidly connected to the second measuring tube and wherein an outlet of the second fluid pump is fluidly connected to the oil well.

14. The fluid metering system of claim 13, wherein the outlets of the first fluid pump and the second fluid pump are fluidly connected to a capillary string within the oil well.

15. The fluid metering system of claim 13, wherein the outlets of the first fluid pump and the second fluid pump are fluidly connected to a pressurized deferred production line of the oil well to treat a pressurized deferred production fluid that is transferred back into the oil well.

16. The fluid metering system of claim 13, including a first injection valve fluidly connected between the first measuring tube and the first fluid pump, and a second injection valve fluidly connected between the second measuring tube and the second fluid pump.

17. The fluid metering system of claim 1, wherein the outlet of the first fluid pump is fluidly connected to a capillary string within the oil well.

18. The fluid metering system of claim 1, wherein the outlet of the first fluid pump is fluidly connected to a pressurized deferred production line of the oil well to treat a pressurized deferred production fluid that is transferred back into the oil well.

19. The fluid metering system of claim 1, including a first injection valve fluidly connected between the first measuring tube and the first fluid pump.

20. A fluid metering system for chemically treating an oil well, comprising:
- a first additive tank storing a first fluid;
- a first measuring tube fluidly connected to the first additive tank;
- a first fill valve fluidly connected between the first additive tank and the first measuring tube;
- a first fluid pump, wherein an inlet of the first fluid pump is fluidly connected to the first measuring tube and wherein an outlet of the first fluid pump is fluidly connected to a pipeline, wherein the pipeline is a water pipeline or a gas pipeline fluidly connected to a separator of an oil well; and
- a control unit in communication with the first fill valve and the first fluid pump, wherein the control unit controls a state of the first fill valve and the first fluid pump for a fill process and for a dosage process, wherein the control unit opens the first fill valve and deactivates the first fluid pump during the fill process thereby filling the first measuring tube with the first fluid, and wherein the control unit closes the first fill valve and activates the first fluid pump during the dosage process thereby transferring the first fluid from the first measuring tube to the pipeline for treating the fluid within the pipeline.

* * * * *